United States Patent [19]

Tagawa et al.

[11] Patent Number: 4,483,426
[45] Date of Patent: Nov. 20, 1984

[54] COILED DAMPER ELEMENT

[75] Inventors: Kengo Tagawa; Toshio Nasu; Takao Yamada, all of Yokohama; Kazuo Yamashita; Tetsuo Eto, both of Tokyo, all of Japan

[73] Assignee: Nippon Kokan Kabushiki Kaisha, Tokyo, Japan

[21] Appl. No.: 604,402

[22] Filed: Apr. 27, 1984

Related U.S. Application Data

[63] Continuation of Ser. No. 333,285, Dec. 22, 1981, abandoned.

[30] Foreign Application Priority Data

Feb. 17, 1981 [JP] Japan .................................. 56-21888

[51] Int. Cl.$^3$ ............................................... F16F 7/04
[52] U.S. Cl. ...................................... 188/378; 52/167; 267/140.5; 267/156; 248/632
[58] Field of Search .................. 52/167; 248/632, 630; 267/59, 136, 156, 140.4, 140.5; 188/378, 380

[56] References Cited

U.S. PATENT DOCUMENTS

| 1,574,985 | 3/1926 | McWain | 248/632 |
| 2,176,971 | 10/1939 | Klotsch | 267/59 |
| 2,932,503 | 4/1960 | Le Van | 267/156 |
| 3,263,954 | 8/1966 | Baratoff | 248/632 |

FOREIGN PATENT DOCUMENTS

| 509562 | 10/1930 | Fed. Rep. of Germany | 267/156 |
| 362470 | 11/1931 | United Kingdom | 248/632 |

Primary Examiner—James L. Ridgill, Jr.
Attorney, Agent, or Firm—Frishauf, Holtz Goodman & Woodward

[57] ABSTRACT

A damper element comprises a lead sheet and vibration-proof sheet spirally and alternately wound to provide a spiral, circular configuration with these sheets bonded to each other. This arrangement permits a shearing energy acting upon one and the other surface of the circular configuration to be absorbed by the deformation of the lead sheet and vibration-proof sheet.

3 Claims, 6 Drawing Figures

COILED DAMPER ELEMENT

This application is a continuation of application Ser. No. 333,285, filed Dec. 22, 1981, now abandoned.

BACKGROUND OF THE INVENTION

This invention relates to a damper element as used to suppress the vibration of a structure resulting from the occurrence of an earthquake, to a smaller extent.

The conventional damper element of this type includes:

(1) an oil damper element utilizing the viscosity of oil and (2) a viscoelastic damper element utilizing the high viscosity of a high-polymeric material.

In the oil damper element, the viscosity of oil varies with a variation of a temperature prevalent in an installation site, varying a damper performance. Furthermore, the oil suffers oxidation during the use, thus requiring a period oil replacement and maintenance. The viscoelastic damper element has a higher temperature dependence due to a variation in temperature prevalent in the installation site. It is therefore difficult to obtain a high performance throughout the year. Moreover, there is a risk that the viscoelastic damper element will be deteriorated where the circumstances of the installation site are worse.

SUMMARY OF THE INVENTION

It is accordingly the object of this invention to provide a maintenance-free damper element having a smaller temperature dependence.

According to this invention there is provided a damper element which comprises a lead sheet and vibration-proof sheet spirally and alternately wound to provide a spiral, circular configuration with these sheets bonded to each other and with the alternate sheet layers stacked one upon the other in a radial direction of the circular configuration, the vibration-proof sheet being made of a high-polymeric material, whereby a shearing energy acting upon one and the other surface of the circular configuration is absorbed by the deformation of the lead sheet and vibration-proof sheet.

DETAILED DESCRIPTION OF THE PREFERRED EMBODIMENT

Figure 1:
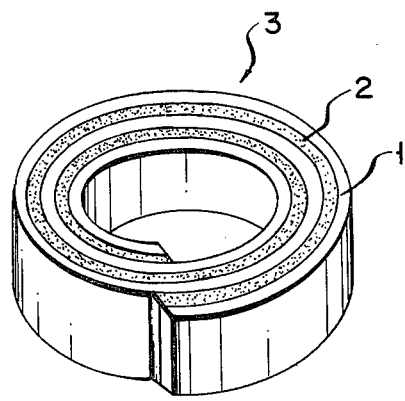
FIG. 1 is a perspective view showing a damper element according to one embodiment of this invention.
Figure 2:
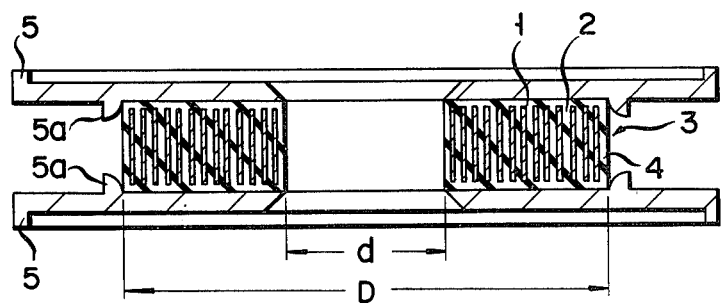
FIG. 2 is a cross-sectional view showing a test piece.

One embodiment of a damper element according to this invention will be explained below by referring to FIG. 1.

A band-like lead sheet 1 and vibration-proof rubber sheet 2 as a vibration-proof sheet are spirally and intimately wound to provide a damper element of a spiral configuration with the alternate layers of the sheet 1 and vibration-proof sheet 2 alternately stacked one upon the other in a radial direction. A shearing energy acting on one and the other surfaces of the spiral configuration is absorbed by the deformation of the lead sheet and vibration-proof sheet.

Now the formation of the test piece of the damper element will be explained below.

The test piece of the damper element is obtained by spirally and intimately winding a 50 mm wide×2 mm thick lead sheet 1 and 50 mm wide×2 mm thick vibration-proof rubber sheet (vibration-proof sheet) 2 by a takeup machine to provide a spiral, circular configuration. In order to readily retain the circular spiral configuration of the lead sheet 1 and vibration-proof sheet 2 when a shearing load acts upon the spiral configuration, a vibration-proof rubber layer is attached as a hoop member 4 to the outer periphery of the spiral configuration with a hoop tension added thereto. The resultant damper element 3 has an inner diameter d of 90 mm and outer diameter D of 280 mm. As a material of the vibration-proof rubber sheet use is made of a butyl series with a rubber hardness of Hs 50 (JIS). A pair of holding plates 5, 5 with an annular projection 5a are backed to be each attached to the upper and lower surfaces of the damper element 3 with the damper element 3 fitted inside the annular projections 5a, 5a of the holding plates 5, 5. In this way, the test piece is manufactured with the lead sheet 1 and vibration-proof sheet 2 intimately contacted with each other and with the vibration-proof sheet 2 and the holding plate 5, 5 intimately contacted with each other.

Figure 3:
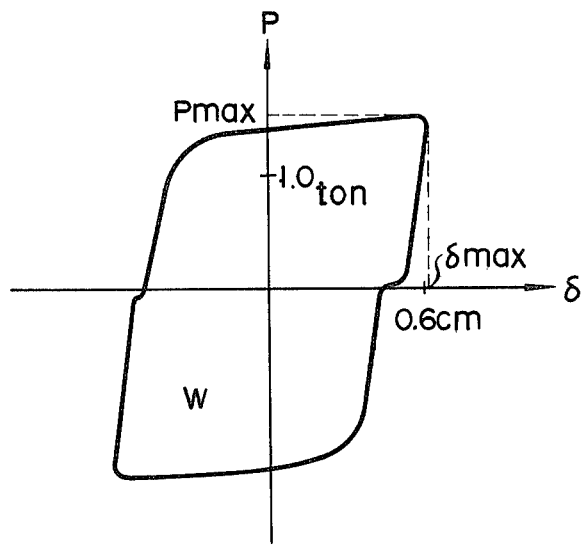
FIG. 3 is an explanatory view showing the hysteresis loop of the test piece.

A shearing load is applied at a frequency of 1 to 4 Hz to the test piece, obtaining a stabilized hysteresis as shown in FIG. 3. Since an energy corresponding to an area W as enclosed by the hysteresis loop is applied to the lead sheet 1 and vibration-proof sheet 2 to cause it to be absorbed therein, vibrations of a structure can be effectively suppressed. In this case, the value of a loss tangent $\beta$ showing an energy absorption capability is around 1.0 and it is possible to obtain an effect equal to, or greater than, that of a conventional viscoelastic damper element. Note, however, that $$\beta = K_2/K_1$$

where $$K_1 = \sqrt{K_3^2 - K_2^2}$$

$$K_2 = \frac{W}{\pi \delta^2_{max}}$$

$$K_3 = P_{max}/\delta_{max}$$

Since the temperature dependence of the lead sheet 1, one of the constituent elements of the damper element 3, is smaller, a relatively stabilized, high performance can be secured even if a temperature prevalent at the installation site varies. Thus, the constituent members of the damper element hardly suffer deterioration and are maintenance-free.

Figure 4:
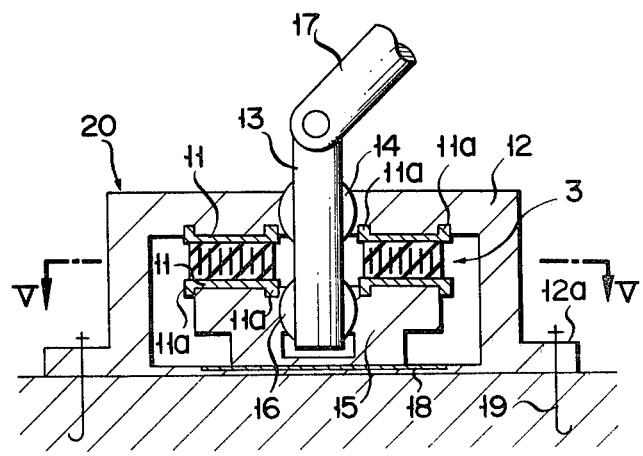
FIG. 4 is a longitudinal cross-sectional view showing one form of a damper device with a damper incorporated therein.
Figure 5:
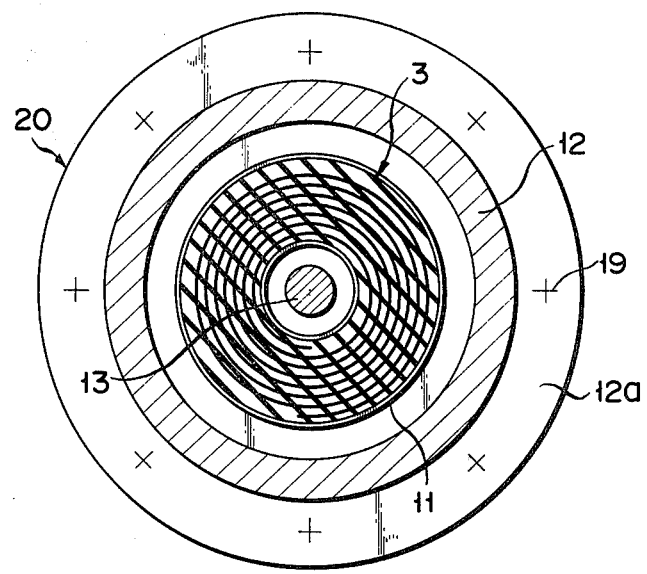
FIG. 5 is a transverse cross-sectional view as taken along line V—V in FIG. 4.
Figure 6:
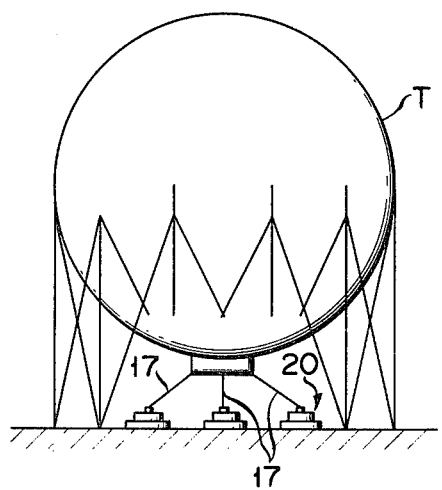
FIG. 6 is an explanatory view showing the FIG. 4 damper device as applied to a spherical tank.

A damper element-equipped damper device as applied to a spherical tank will be explained below by referring to FIGS. 4 to 6.

A vibration proof rubber layer is disposed as a hoop member around the spiral configuration of a damper element and a pair of upper and lower holding plates 11, 11 each having radially inner and outer annular projections 11a, 11a are backed to the upper and lower surfaces of the damper element 3 respectively. In FIG. 4, reference numeral 12 shows a cylindrical casing having a fixed flange 12a at its lower end. In the rear surface of the top plate of the casing are provided annular recesses into which the corresponding annular projections 11a of one of the holding plates 11, 11 are fitted. In the central portion of the top plate of the casing is mounted an upper spherical bearing 14 with a bore through which a rocking shaft 13 extends. A spherical slide plate 15 is fitted into a spacing defined between the annular projections 11a, 11a of the lower holding plate 11. In the central hole of the spherical slide plate 15 is disposed a lower spherical bearing 16 with a bore through which the rocking shaft 13 extends. Thus, the shaft 13 extends through the bores of the upper and lower spherical bearings 14, 16 and the upper end of the shaft 13 is connected by a pin to a rod 17 which in turn is mounted on the lower portion of a spherical tank T. The displacement of the spherical tank T causes a lateral movement of the slide plate 15. A friction plate 18 is placed between the slide plate 15 and a bottom plate of the casing 12 to permit the ready lateral movement of the slide plate 15. A plurality of damper devices so constructed are secured by anchor bolts 19 on the concentrical portion of a foundation for the spherical tank T as shown in FIG. 6 and the upper ends of the rocking shafts 13 are connected by the corresponding pins to the corresponding rods 17, . . . which are mounted on the lower section of the spherical tank T.

Now suppose that the spherical tank T is displaced due to the occurrence of an earthquake. In this case, the displacement of the spherical tank T is transmitted through the rod 17 to the damper device 20. That is, the rocking shaft 13 connected to the rod 17 is rocked with the spherical bearing 14 as a fulcrum, causing the slide plate 15 to be moved laterally to impart a shearing force to the damper element 3. Since the shearing energy resulting from the occurrence of an earthquake is absorbed by the damper element 3, it is possible to suppress the vibration of the spherical tank T to a smaller extent. Note that, if the damping constant of the structure is smaller, it is possible to effectively suppress the vibration of the structure.

The damper element may be formed in a circular configuration by alternately fitting one of annular lead sheets of varying diameters into the other of annular vibration-proof rubber sheets of varying diameters. A lead sheet and vibration-proof sheet may be spirally and intimately wound to provide a damper element of a spiral configuration with the spirally stacked layers adhesively bonded to each other, and the resultant damper element may be compression-bonded directly between the members of the structure, without interposing any holding plates, which suffers a possible relative displacement resulting from the occurrence of an earthquake. If, in this case, the outer periphery of the damper element is firmly encircled by a vibration-proof rubber layer (as a hoop member) the intimately bonded state between the lead sheet and vibration-proof sheet is effectively maintained when the shearing load acts on the damper element. With the holding plates each bonded to the upper and lower surfaces of the damper element the structure can be readily mounted on the installation site and exhibit a stabilized performance. Instead of bonding the holding plates to the damper element, piercing projections may be provided on the inner side surfaces of the holding plates and the damper element may be incorporated into the damper device with a pair of holding plates each compressed to the upper and lower surfaces of the circular configuration while the piercing projections are pierced into the damper element, whereby the movement of the holding plates is transmitted to the vibration-proof sheet.

With the damper element of this invention, a possible displacement of the structure resulting from the occurrence of an earthquake can be suppressed to a smaller extent. Because the lead plate, one of the constituent elements of the damper element, has a smaller temperature dependence, the damper can maintain a relatively stable, high performance, even if a temperature prevalent at the installation site varies. The constituent elements of the damper element are hardly deteriorated, thus requiring no maintenance.

What we claim is:

1. A coiled damper element for absorbing shearing forces, comprising a lead sheet and a vibration-proof sheet bonded to said lead sheet, said bonded lead sheet and said vibration-proof sheet being spirally wrapped so as to form alternate layers of a substantially circular configuration which are stacked one upon the other in the radial direction of said spiral damper element to thereby form an outer peripheral surface, an upper surface and a lower surface, said upper and lower surfaces extending substantially transverse to the axial direction of said spiral damper element, and said peripheral surface conforming to the outermost layer of said spiral and extending substantially in the axial direction of said spiral damper element, said vibration-proof sheet being made of a high-polymeric material.

2. The damper element of claim 1, further comprising an elastic hoop member provided on the peripheral surface of the outermost layer of said damper element, said hoop member always being under tension both when said damper element is subjected to a shearing force and when said damper element is not subjected to a shearing force, said hoop member preventing said damping element from buckling.

3. The damper element of claim 1 or claim 2, further comprising a pair of holding plates fixed to the upper and lower surfaces of said damper element.

* * * * *